Jan. 6, 1931.      T. N. ROWLING      1,787,734

PIPE CLIP

Filed Jan. 21, 1929

INVENTOR.
T. N. Rowling.
BY E.G. Featherstonhaugh
ATTORNEY

Patented Jan. 6, 1931

1,787,734

UNITED STATES PATENT OFFICE

THOMAS NOBLE ROWLING, OF OUTREMONT, QUEBEC, CANADA

PIPE CLIP

Application filed January 21, 1929. Serial No. 333,630.

The invention relates to a pipe clip as described in the present specification and illustrated in the accompanying drawings that form part of the same.

The invention consists essentially of the novel features of construction pointed out broadly and specifically in the claims for novelty following a description containing an explanation in detail of an acceptable form of the invention.

The objects of the invention are to effect a secure fastening for various kinds of pipes to walls, particularly to cement walls where it is desirable to use a single screw; to facilitate the installation of electric wiring in modern buildings; to furnish to the trade a fitting adaptable for mass production and therefore available at a low price to the consumer; to maintain wiring systems in good condition and thereby avoid short circuits and troubles frequently resulting in conflagrations; to eliminate creeping in pipe lines and thus retain the screw or other fastening in its place; and generally to provide a reliable economical and efficient pipe clip.

In the drawings, Figure 1 is a perspective view of the fitting complete.

Like numerals of reference indicate corresponding parts in the various figures.

Figure 1:
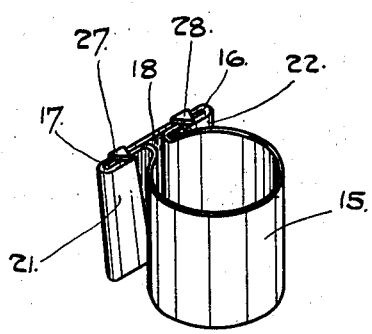
Figure 2:
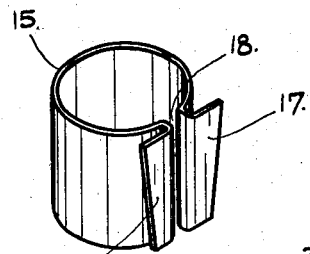
Figure 2 is a perspective detail of the clip proper.
Figure 3:
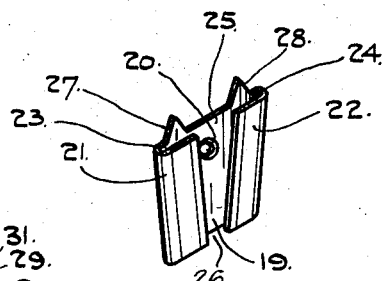
Figure 3 is a perspective detail of the clamping base.
Figure 4:
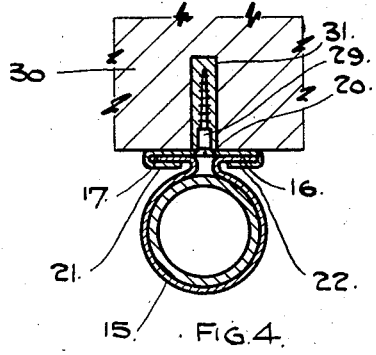
Figure 4 is a cross sectional view of the clip in engagement with a pipe.

Referring to the drawings, the numeral 15 indicates the clip proper made in the shape of a split ring of sheet metal and having the tapered flanges 16 and 17 on either side of the split 18.

The clamping base plate 19 is formed of sheet metal and has the screw hole 20 and the inturned flanges 21 and 22 forming the longitudinal grooves 23 and 24 for the flanges 16 and 17 and tapering from the ingress end 25 to the binding end 26. The stop lugs 27 and 28 project from the plate at the ingress end 25 in alignment with the grooves 23 and 24 and form stops to hold the clip securely in the base.

The screw 29 is inserted through the hole 20 into the cement wall 30 in the bushing 31 before the introduction of the clip into the base.

In the operation of the invention the base is attached to the wall or flooring and the clip proper is snapped or slid on the pipe and inserted into the grooves of the clamping base plate and tapped, until it binds therein, thus tightening the ring on the pipe. The stop lugs are then knocked outwardly against the flanges of the clip proper, thereby firmly locking the clip to its permanent place.

What I claim is:—

A pipe clip comprising a ferrule having tapering flanges on either side of a longitudinal split and a retaining wall plate having inturned flanges forming a tapered recess for said flanges and base lugs at the wide end of said plate adapted to be turned over said recesses.

Signed at Montreal, Canada, this 27th day of December, 1928.

THOMAS NOBLE ROWLING.